(12) United States Patent
Ko et al.

(10) Patent No.: US 10,757,666 B2
(45) Date of Patent: *Aug. 25, 2020

(54) METHOD AND DEVICE FOR TRANSMITTING AND RECEIVING SIGNAL BETWEEN USER EQUIPMENT AND BASE STATION IN WIRELESS COMMUNICATION SYSTEM

(71) Applicant: LG ELECTRONICS INC., Seoul (KR)

(72) Inventors: Hyunsoo Ko, Seoul (KR); Kijun Kim, Seoul (KR); Eunsun Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,605

(22) Filed: Sep. 10, 2019

(65) Prior Publication Data

US 2020/0008164 A1 Jan. 2, 2020

Related U.S. Application Data

(63) Continuation of application No. 16/065,119, filed as application No. PCT/KR2018/001576 on Feb. 6, 2018, now Pat. No. 10,440,672.

(Continued)

(51) Int. Cl.
*H04W 4/00* (2018.01)
*H04W 56/00* (2009.01)
(Continued)

(52) U.S. Cl.
CPC ............ *H04W 56/001* (2013.01); *H04B 7/06* (2013.01); *H04B 7/0617* (2013.01); *H04J 11/00* (2013.01);
(Continued)

(58) Field of Classification Search
None
See application file for complete search history.

(56) References Cited

U.S. PATENT DOCUMENTS 9,548,845 B2 1/2017 Yi et al.
2013/0003672 A1 1/2013 Dinan
(Continued)

FOREIGN PATENT DOCUMENTS

CN 103428863 12/2013
CN 104104636 10/2014
(Continued)

OTHER PUBLICATIONS

PCT International Application No. PCT/KR2018/001576, Notification of Transmittal of the International Search Report and the Written Opinion of the International Searching Authority, or Declaration dated May 14, 2018, 26 pages.

(Continued)

*Primary Examiner* — Bob A Phunkulh
(74) *Attorney, Agent, or Firm* — Lee, Hong, Degerman, Kang & Waimey PC

(57) ABSTRACT

The present invention discloses a method for transmitting and receiving signals between a user equipment and a base station in a wireless communication system and device for supporting the same. More specifically, the invention discloses a method by which, when a base station transmits synchronization signal blocks in various beam directions, a user equipment achieves synchronization with the base station by detecting the index of a received synchronization signal block and then transmits and receives signals with the base station.

12 Claims, 13 Drawing Sheets

Related U.S. Application Data

(60) Provisional application No. 62/455,544, filed on Feb. 6, 2017, provisional application No. 62/472,505, filed on Mar. 16, 2017.

(51) Int. Cl.

| | | |
|---|---|---|
| *H04L 27/26* | (2006.01) | |
| *H04W 72/04* | (2009.01) | |
| *H04W 48/16* | (2009.01) | |
| *H04W 16/28* | (2009.01) | |
| *H04B 7/06* | (2006.01) | |
| *H04J 11/00* | (2006.01) | |

(52) U.S. Cl.
CPC ...... *H04L 27/2613* (2013.01); *H04L 27/2666* (2013.01); *H04W 16/28* (2013.01); *H04W 48/16* (2013.01); *H04W 72/046* (2013.01); *H04W 72/0446* (2013.01)

(56) References Cited

U.S. PATENT DOCUMENTS

| | | | |
|---|---|---|---|
| 2013/0003673 A1 | 1/2013 | Dinan | |
| 2013/0250882 A1 | 9/2013 | Dinan | |
| 2013/0308555 A1 | 11/2013 | Ho | |
| 2014/0086173 A1 | 3/2014 | Sadeghi et al. | |
| 2014/0302855 A1 | 10/2014 | Nory et al. | |
| 2014/0348063 A1* | 11/2014 | Kang ...................... | H04W 4/70 |
| | | | 370/328 |
| 2015/0029972 A1 | 1/2015 | Park et al. | |
| 2015/0257173 A1 | 9/2015 | You et al. | |
| 2016/0270060 A1 | 9/2016 | Kusashima et al. | |
| 2016/0301515 A1 | 10/2016 | Ouchi et al. | |
| 2016/0381681 A1 | 12/2016 | Nogami et al. | |
| 2017/0005848 A1 | 1/2017 | Zheng et al. | |
| 2017/0111886 A1 | 4/2017 | Kim et al. | |
| 2017/0170931 A1 | 6/2017 | Kusashima et al. | |
| 2017/0238287 A1 | 8/2017 | Kusashima et al. | |
| 2017/0280454 A1 | 9/2017 | Kusashima et al. | |
| 2017/0310447 A1 | 10/2017 | Kusashima et al. | |
| 2017/0347270 A1 | 11/2017 | Iouchi et al. | |
| 2018/0241525 A1 | 8/2018 | Ouchi et al. | |
| 2018/0287866 A1 | 10/2018 | Yoon | |
| 2019/0200306 A1 | 6/2019 | Ko et al. | |

FOREIGN PATENT DOCUMENTS

| | | |
|---|---|---|
| JP | 2016-539518 | 12/2016 |
| KR | 1020140120173 | 10/2014 |
| KR | 1020160121367 | 10/2016 |
| KR | 1020160131298 | 11/2016 |
| WO | 2014073928 | 5/2014 |
| WO | 2014098401 | 6/2014 |
| WO | 2016089146 | 6/2016 |

OTHER PUBLICATIONS

Intel, "Considerations for synchronization signal sequence", 3GPP TSG RAN WG1 NR AH_NR Meeting, R1-1700330, Jan. 2017, 7 pages.
Qualcomm, "Single beam PBCH design", 3GPP TSG RAN WG1 Meeting #87, R1-1612027, Nov. 2016, 4 pages.
Luo, J. et al., "Preliminary radio interface concepts for mm-wave mobile communications", Document No. H2020-ICT-671650-mmMAGIC/D4.1, Jun. 2016, 232 pages.
Itl, "Synchronization Signal Structure", 3GPP TSG RAN WG1 NR Ad-Hoc Meeting, R1-1701037, Jan. 2017, 7 pages.
Qualcomm, "Multi-beam PBCH design", 3GPP TSG RAN WG1 Meeting #87, R1-1612028, Nov. 2016, 4 pages.
Huawei, et al., "WF on SS-block Index Indication", 3GPP TSG RAN WG1 NR Ad Hoc Meeting, R1-1701377, Jan. 2017, 3 pages.
Qualcomm, et al., "WF on Sync signal Structure", 3GPP TSG RAN WG1 Meeting #87, R1-1613154, Nov. 2016, 3 pages.
State Intellectual Property Office of the People's Republic of China Application Serial No. 201880002797.5, Office Action dated Nov. 28, 2019, 10 pages.
Japan Patent Office Application No. 2019-521439, Office Action dated Jun. 9, 2020, 2 pages.

* cited by examiner

METHOD AND DEVICE FOR TRANSMITTING AND RECEIVING SIGNAL BETWEEN USER EQUIPMENT AND BASE STATION IN WIRELESS COMMUNICATION SYSTEM

CROSS-REFERENCE TO RELATED APPLICATIONS

This application is a continuation of U.S. patent application Ser. No. 16/065,119, filed on Jun. 21, 2018, now U.S. Pat. No. 10,440,672, which is the National Stage filing under 35 U.S.C. 371 of International Application No. PCT/KR2018/001576, filed on Feb. 6, 2018, which claims the benefit of U.S. Provisional Application Nos. 62/455,544, filed on Feb. 6, 2017, and 62/472,505, filed on Mar. 16, 2017, the contents of which are all hereby incorporated by reference herein in their entirety.

TECHNICAL FIELD

The present invention relates to a wireless communication system, and more particularly, to a method for transmitting and receiving signals between a user equipment and a base station in a wireless communication system supporting transmission in one or more beam directions and device for supporting the same.

More specifically, the present invention is directed to a method by which, when a base station transmits synchronization signal blocks in one or more beam directions, a user equipment achieves synchronization with the base station by detecting the index of a received synchronization signal block (e.g., SS/PBCH block index) and then transmits and receives signals with the base station.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

An object of the present invention is to provide a method for transmitting and receiving signals between a user equipment and a base station in a newly proposed communication system.

In particular, another object of the present invention is to provide a method by which, when a base station transmits synchronization signal blocks in one or more beam directions in the newly proposed communication system, a user equipment achieves synchronization with the base station by detecting the index of a received synchronization signal block and then transmits and receives signals with the base station.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for transmitting and receiving signals between a user equipment and a base station in a wireless communication system and devices therefor.

In an aspect of the present invention, provided herein is a method for transmitting and receiving signals to and from a base station (BS) by a user equipment (UE) in a wireless communication system. The method includes: receiving a synchronization signal/physical broadcast channel (SS/PBCH) block from the BS; determining an index of the received SS/PBCH block based on a demodulation reference signal (DM-RS) sequence for a PBCH included in the SS/PBCH block or a combination of the sequence and information included in the PBCH; and performing synchronization with the BS based on the determined index of the SS/PBCH block.

In another aspect of the present invention, provided herein is a user equipment (UE) for transmitting and receiving signals to and from a base station (BS) in a wireless communication system. The UE includes: a transmitter; a receiver; and a processor connected to the transmitter and receiver, wherein the processor is configured to: receive a synchronization signal/physical broadcast channel (SS/PBCH) block from the BS; determine an index of the received SS/PBCH block based on a demodulation reference signal (DM-RS) sequence for a PBCH included in the SS/PBCH block or a combination of the sequence and information included in the PBCH; and perform synchronization with the BS based on the determined index of the SS/PBCH block.

The SS/PBCH block may further comprise a primary synchronization signal (PSS) and a secondary synchronization signal (SSS).

At this time, the UE may obtain time synchronization and a cell identifier (ID) based on the PSS and SSS.

In this case, a Gold sequence may be used as the DM-RS sequence.

For example, the Gold sequence may use an initial value determined based on the cell ID and the index of the SS block.

In this configuration, the PBCH has a transmission time interval (TTI) of 80 MS.

In a further aspect of the present invention, provided herein is a method for transmitting and receiving signals to and from a user equipment (UE) by a base station (BS) in a wireless communication system. The method includes: transmitting at least one synchronization signal/physical broadcast channel (SS/PBCH) block, wherein a demodulation reference signal (DM-RS) sequence for a PBCH included in each SS/PBCH block or a combination of the sequence and information included in the PBCH indicates an index of each SS/PBCH block; and transmitting and receiving signals to and from the UE that performs synchronization with the BS based on the at least one SS/PBCH block.

In a still further aspect of the present invention, provided herein is a base station (BS) for transmitting and receiving signals to and from a user equipment (UE) in a wireless communication system. The BS includes: a transmitter; a receiver; and a processor connected to the transmitter and receiver, wherein the processor is configured to: transmit at least one synchronization signal/physical broadcast channel (SS/PBCH) block, wherein a demodulation reference signal (DM-RS) sequence for a PBCH included in each SS/PBCH block or a combination of the sequence and information included in the PBCH indicates an index of each SS/PBCH block; and transmit and receive signals to and from the UE that performs synchronization with the BS based on the at least one SS/PBCH block.

In this case, the at least one SS/PBCH block may be transmitted via an independent beam.

In addition, the SS/PBCH block may further comprise a primary synchronization signal (PSS) and a secondary synchronization signal (SSS).

Moreover, the DM-RS sequence for the PBCH included in each SS/PBCH block may correspond to a Gold sequence based on a cell identifier (ID) and each SS/PBCH block index.

The described aspects of the present invention are merely part of the embodiments of the present invention. It will be appreciated by those skilled in the art that various modifications and alternatives could be developed from the following technical features of the present invention.

Advantageous Effects

As is apparent from the above description, the embodiments of the present disclosure have the following effects.

According to the present invention, when a base station transmits a plurality of synchronization signal blocks in one or more beam directions, a user equipment may detect the index of a received synchronization signal block, know which one of the plurality of synchronization signal blocks corresponds to the detected synchronization signal block, and then perform signal transmission and reception with the base station.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
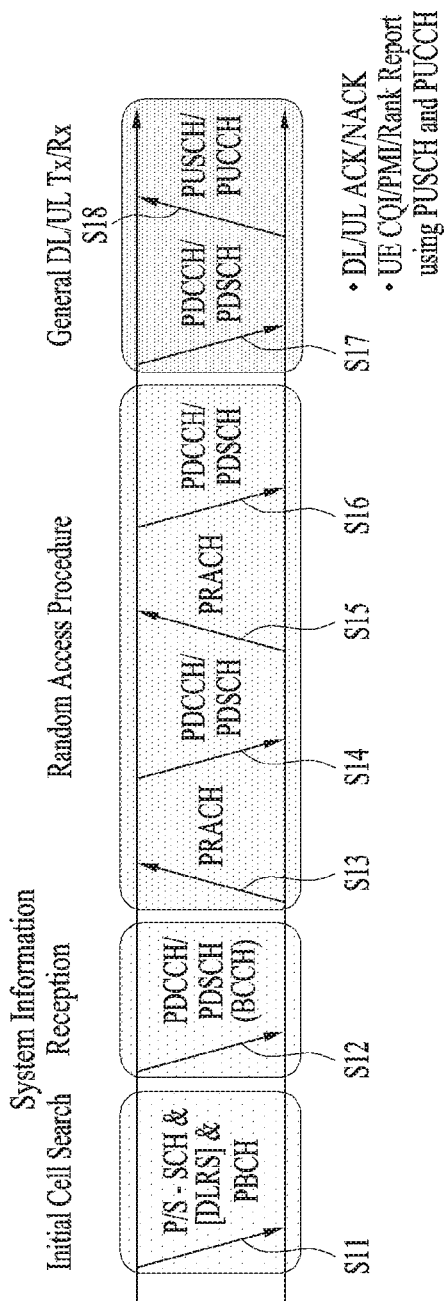
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, Clear Channel Assessment (CCA), and Channel Access Procedure (CAP).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
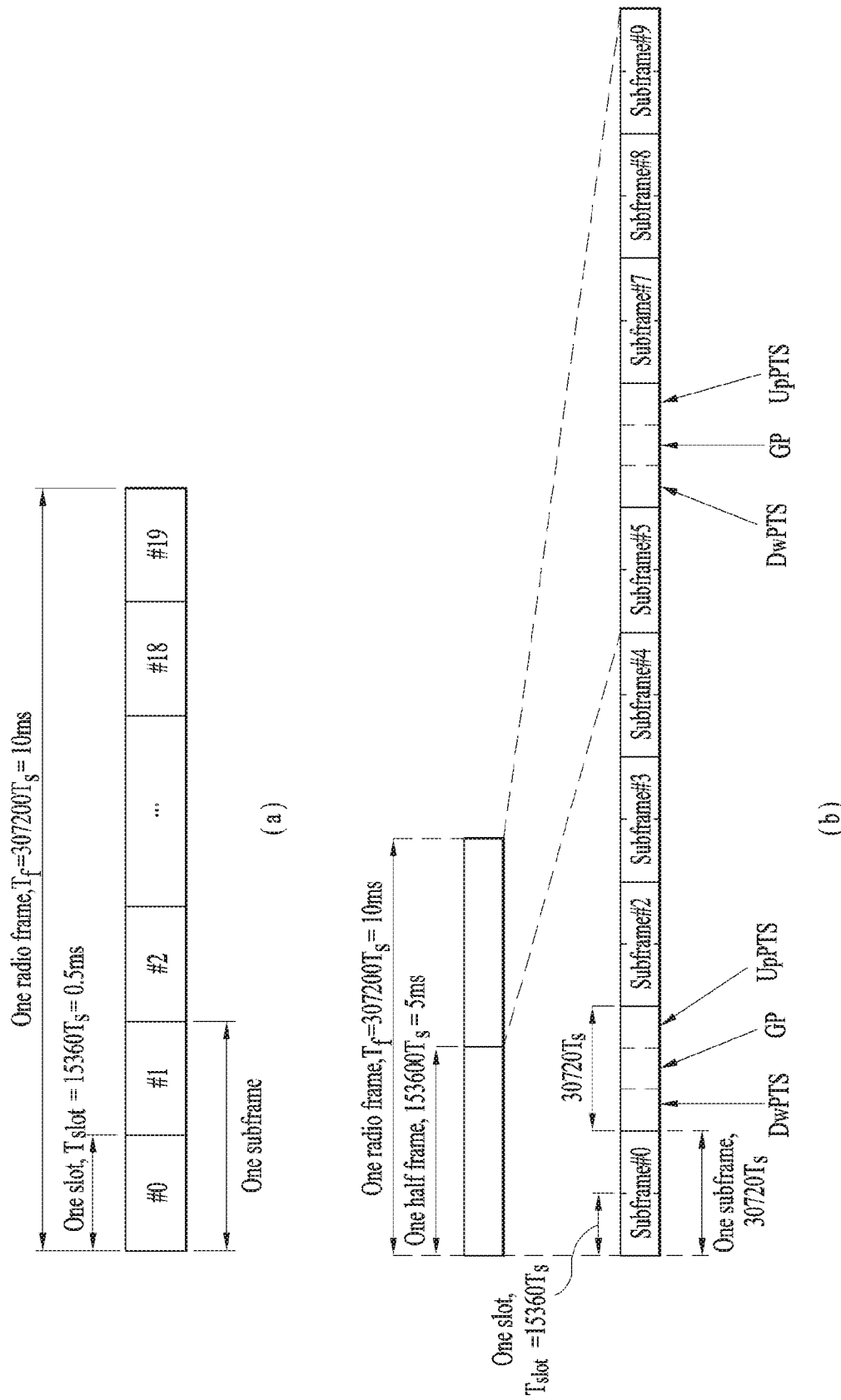
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
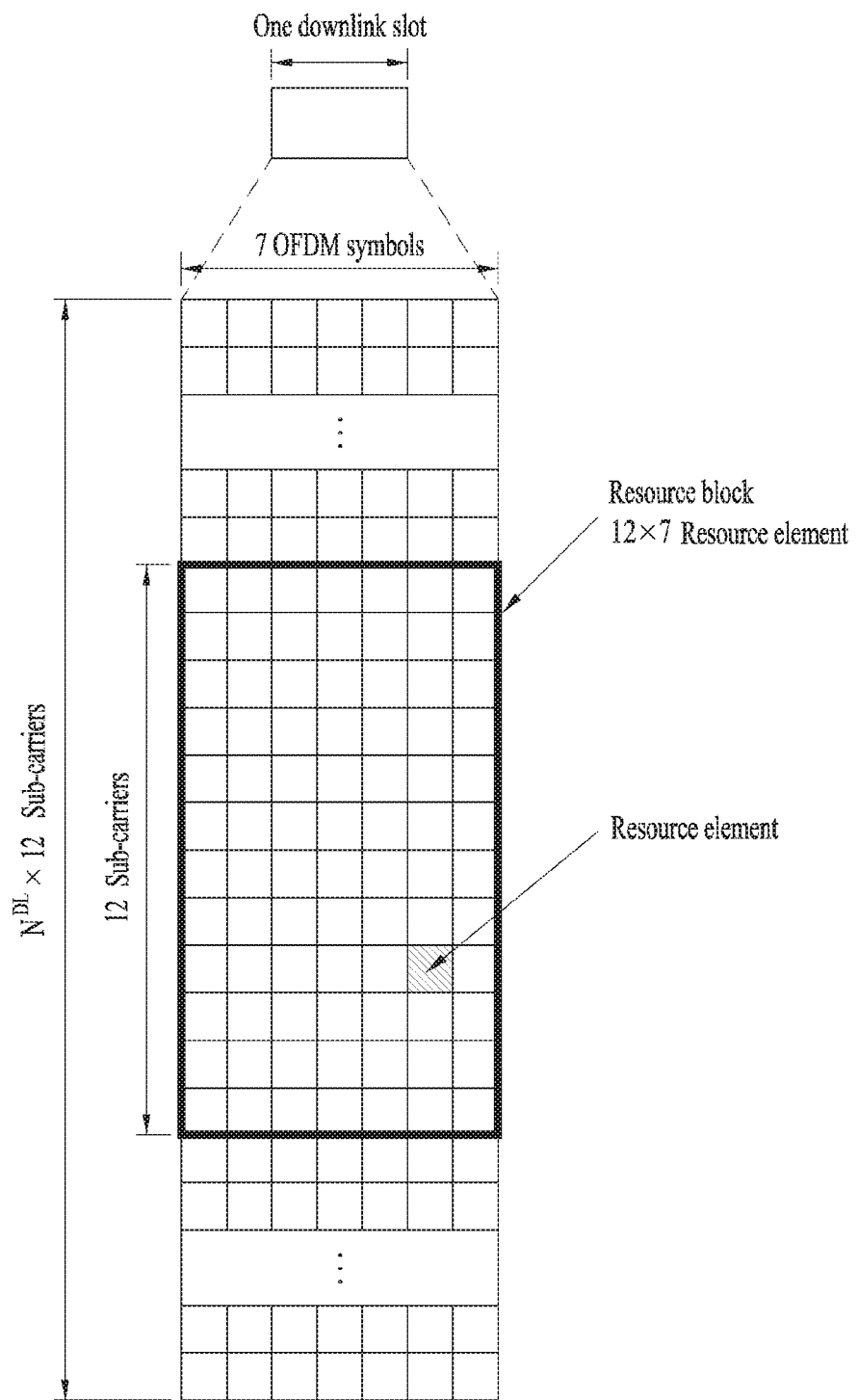
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
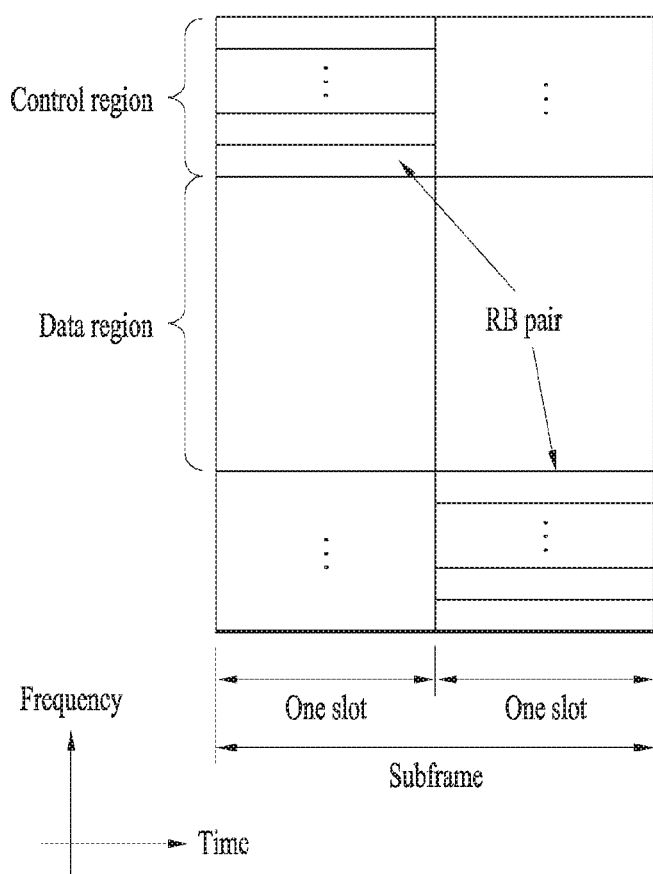
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
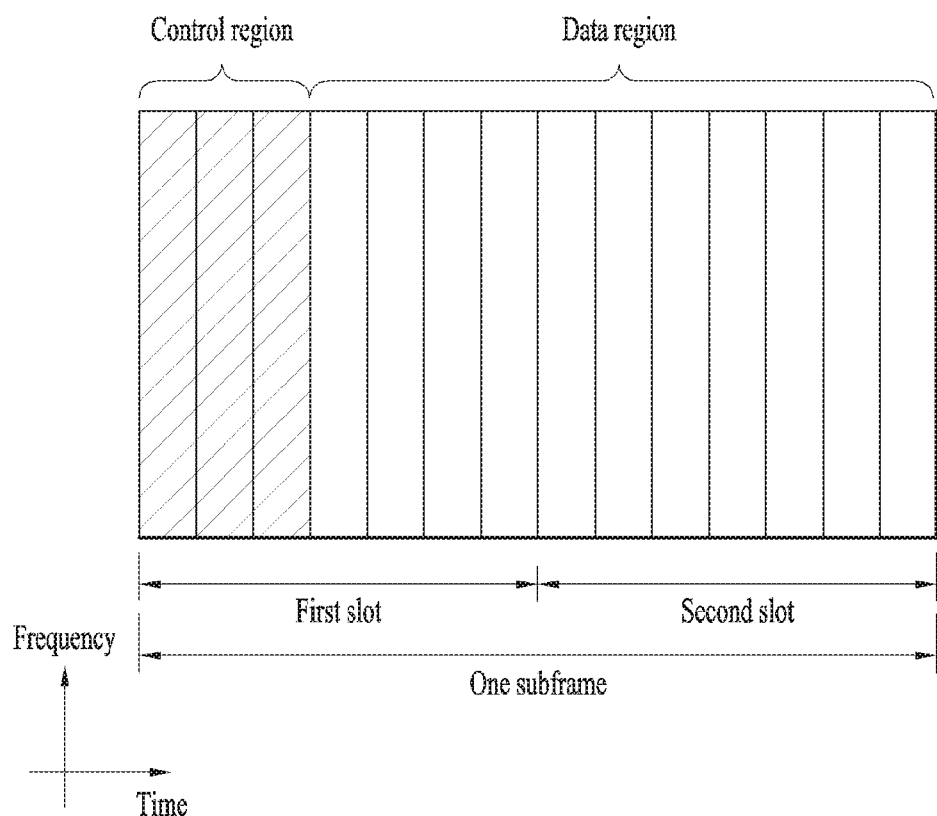
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, a user equipment (UE) is defined to report channel state information (CSI) to a base station (BS) (or eNB). Herein, the CSI collectively refers to information indicating the quality of a radio channel (link) established between a UE and an antenna port.

For example, the CSI may include a rank indicator (RI), a precoding matrix indicator (PMI), and a channel quality indicator (CQI).

Herein, the RI, which indicates rank information about a channel, represents the number of streams that a UE receives through the same time-frequency resources. The RI value is determined depending on long-term fading of the channel and is thus usually fed back to the BS by the UE with a longer period than that for the PMI and CQI.

The PMI, which is a value reflecting the channel space characteristics, indicates a precoding index preferred by the UE based on a metric such as the SINR.

The CQI, which is a value indicating the intensity of a channel, typically indicates a reception SINR which may be obtained by the BS when the PMI is used.

In the 3GPP LTE or LTE-A system, the BS configures a plurality of CSI processes for the UE and receive CSI for each process from the UE. In this case, the CSI process is configured with a CSI-RS for measuring the quality of the signal from the BS and CSI interference measurement (CSI-IM) resources.

1.4. RRM Measurement

The LTE system supports radio resource management (RRM) operation including power control, scheduling, cell search, cell reselection, handover, radio link or connection monitoring, and connection establishment and re-establishment. In this case, the serving cell may request the UE to send RRM measurement information corresponding to the measurement value for performing the RRM operation. As representative examples, in the LTE system, the UE may measure cell search information, reference signal received power (RSRP), reference signal received quality (RSRQ), and the like for each cell and then transmit the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, the UE operating in the LTE system may measure the RSRP in the bandwidth indicated by the allowed measurement bandwidth related information element (IE) transmitted in system information block type 3 (SIB3). Meanwhile, in the case of inter-frequency measurement, the UE may measure the RSRP in the bandwidth corresponding to one of 6, 15, 25, 50, 75, 100 resource blocks (RBs) indicated by the allowed measurement bandwidth related IE transmitted in SIB5. Alternatively, when there is no IE, the UE may measure the RSRP in the entire downlink system frequency band as the default operation.

Upon receiving information on the allowed measurement bandwidth, the UE may consider the corresponding value as the maximum measurement bandwidth and then freely measure the RSRP value in the corresponding value. However, if the service cell transmits an IE defined as WB-RSRQ to the UE and set the allowed measurement bandwidth equal to or higher than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 2

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 3 shows the number of OFDM symbols in each slot/frame/subframe in the case of the normal cyclic prefix, and Table 4 shows the number of OFDM symbols in each slot/frame/subframe in the case of the extended cyclic prefix.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 6:
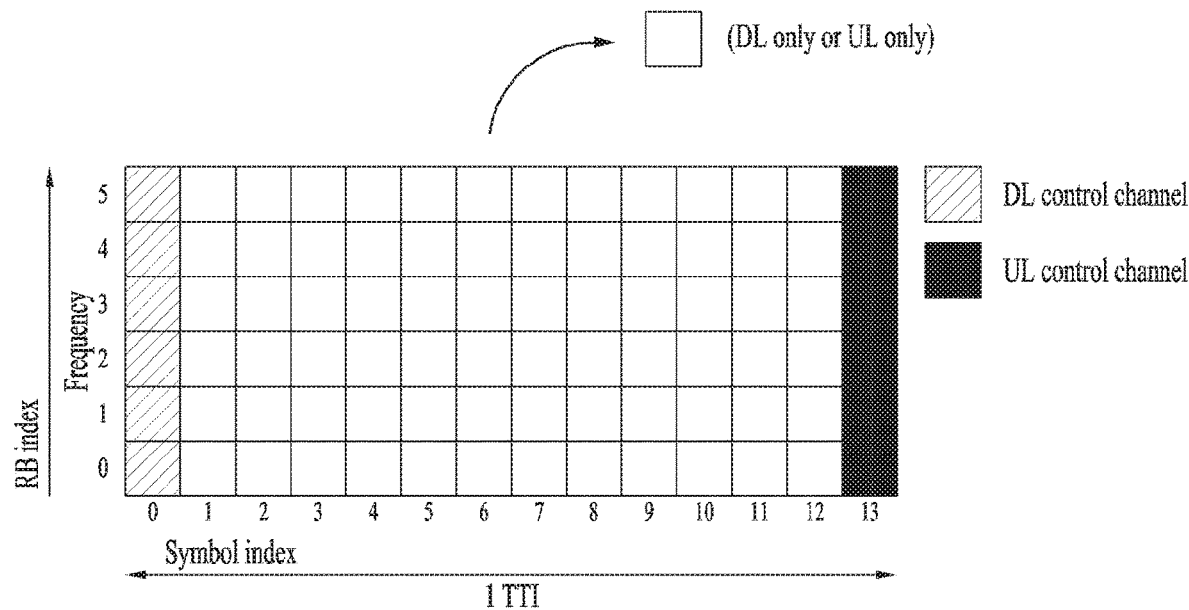
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30

GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
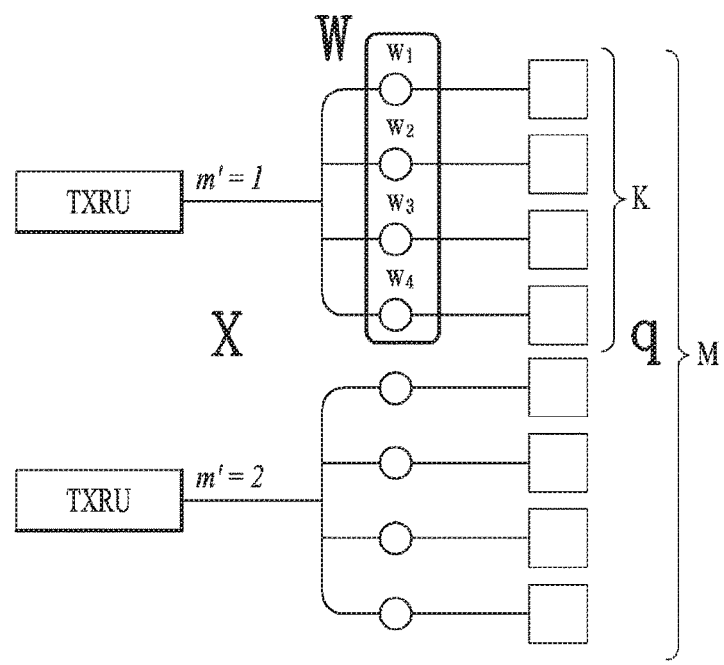
FIGS. 7 and 8 are diagrams illustrating representative methods for connecting TXRUs to antenna elements.
Figure 8:
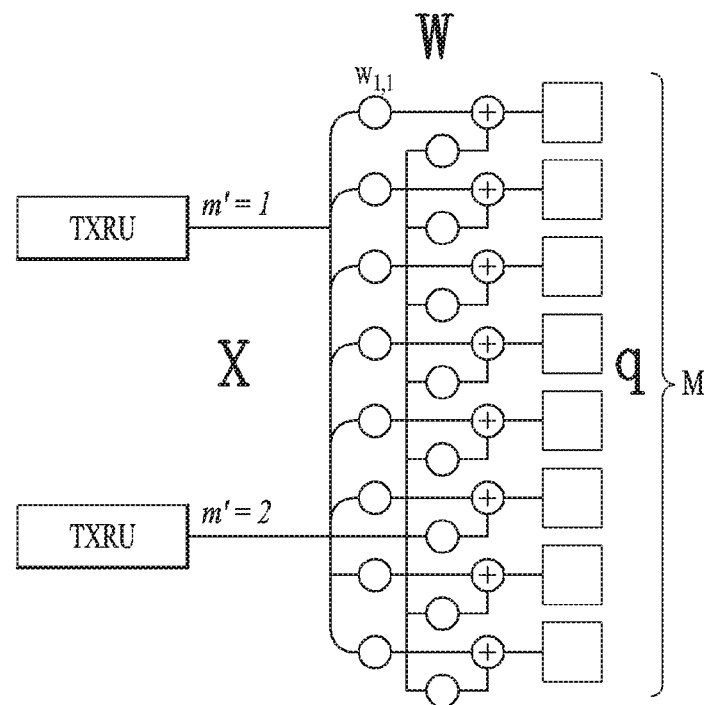

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
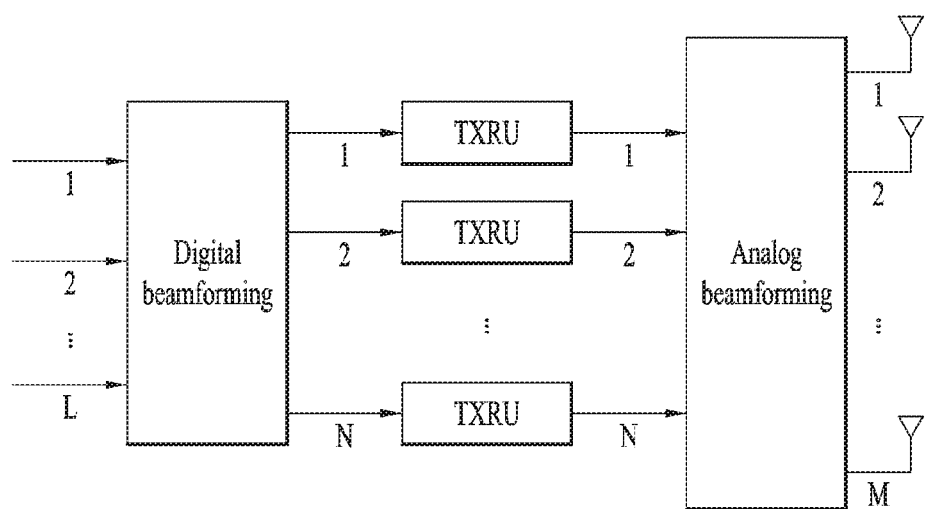
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
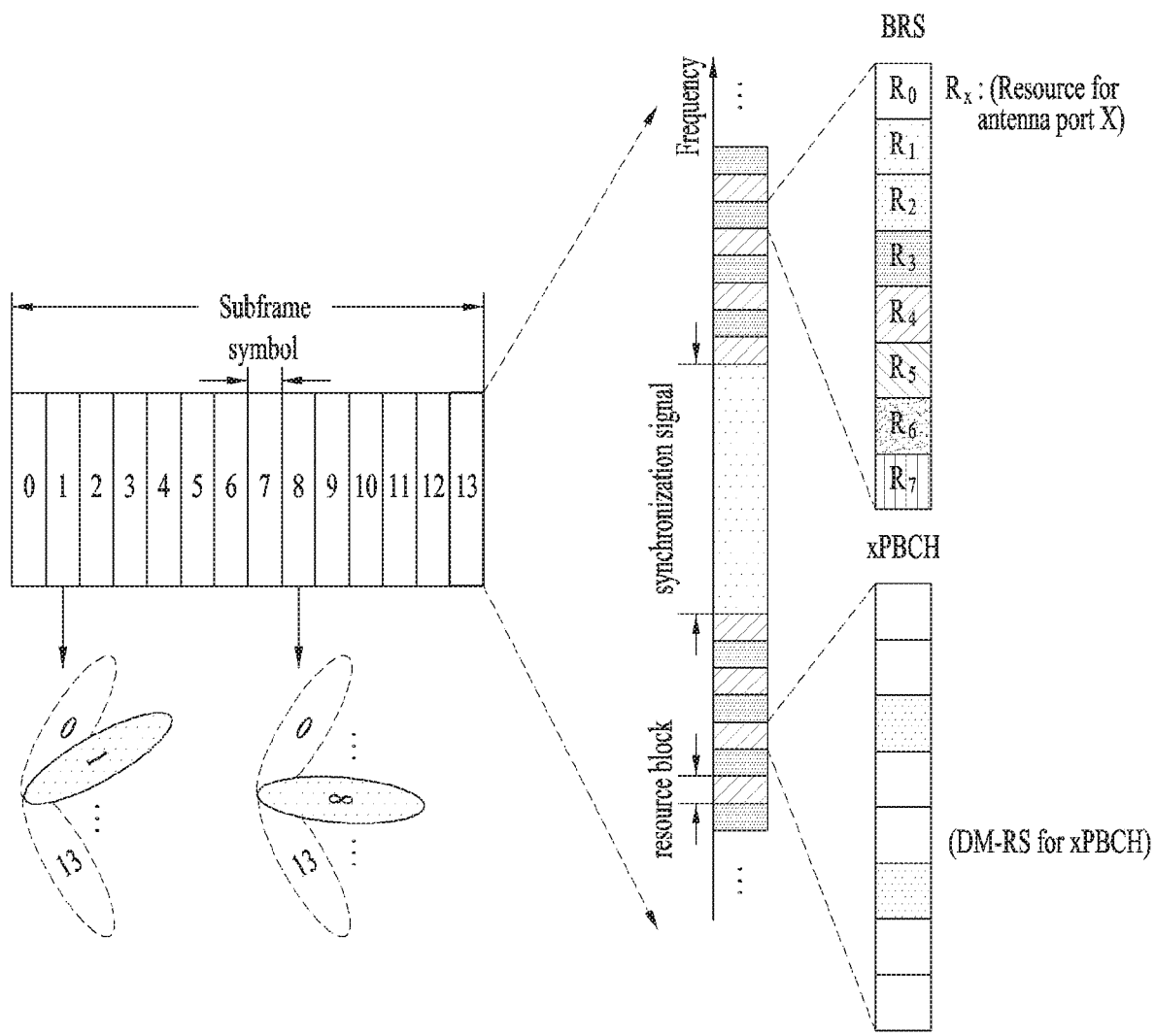
FIG. 10 is a diagram schematically illustrating beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, as shown in FIG. 10, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

2.4. Synchronization Signal Block

In the NR system to which the present invention is applicable, a primary synchronization signal (PSS) SSS, a secondary synchronization signal (SSS), and/or a physical broadcast channel (PBCH) can be transmitted within one synchronization signal (SS) block. In this case, multiplexing other signals are not precluded within the one SS block.

One SS burst may be composed of one or multiple SS blocks. In this case, the SS blocks included in one SS bust may be consecutive or not, and they may be equal to or different from each other.

Figure 11:
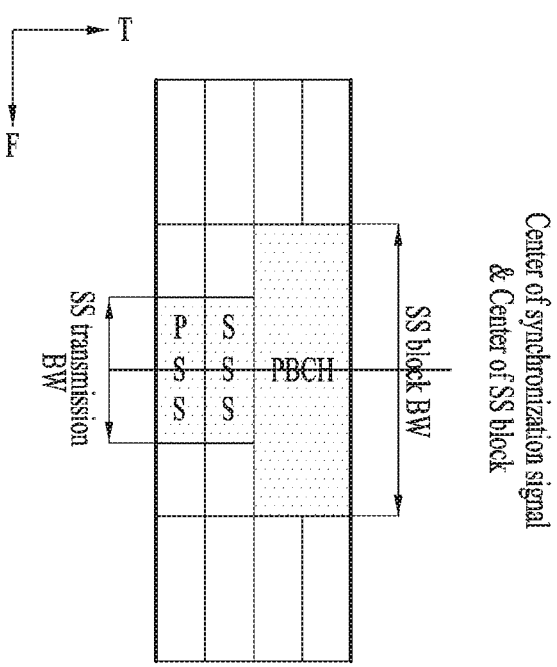
FIG. 11 schematically illustrates the structure of an SS block applicable to the present invention.

FIG. 11 schematically illustrates the structure of an SS block applicable to the present invention.

As shown in FIG. 11, a PSS, SSS, and PBCH can be transmitted in four symbols. In this case, the PSS and SSS may be transmitted on different symbols in the same frequency band. In particular, the symbol in which the PSS is transmitted may be located prior to that in which the SSS is transmitted in the time domain.

In addition, the frequency band where the PBCH is transmitted is larger than that where the PSS and SSS are transmitted, and the symbols where the PBCH is transmitted may be behind that where the PSS is transmitted.

FIG. 11 shows that the SS block is transmitted in the following order: PSS, SSS, and PBCH, but the SS block may be transmitted in the following order: PSS, PBCH, SSS, and PBCH. In this case, since the frequency band where the PBCH is transmitted is larger than that where the PSS and SSS are transmitted, the PBCH may be transmitted in the symbols where the SSS is transmitted and in the frequency band where no SSS is transmitted.

An SS burst set may be composed of one or a plurality of SS bursts

Figure 12:
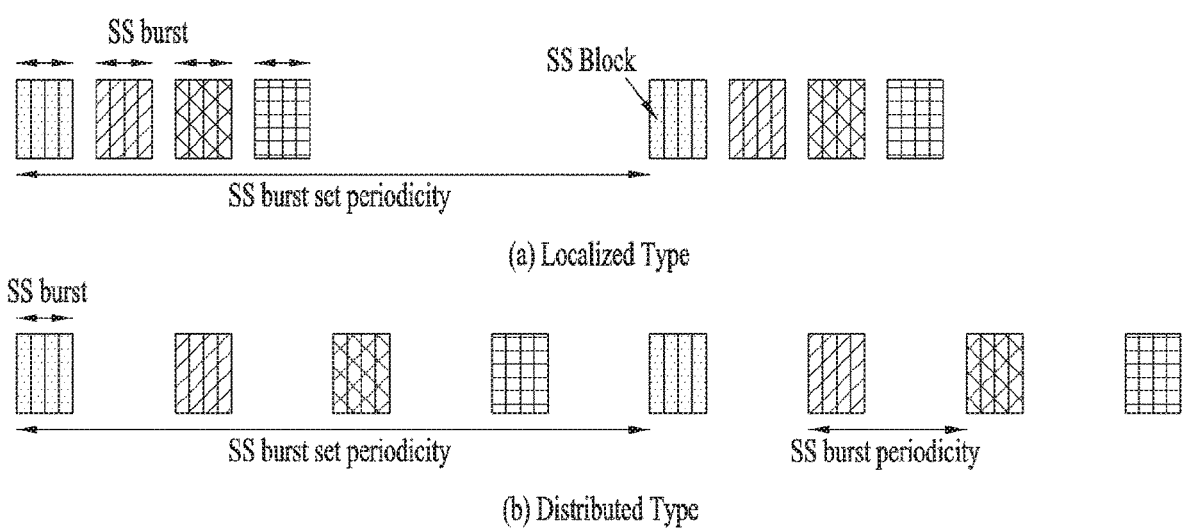
FIG. 12 schematically illustrates the structure where a plurality of SS bursts are transmitted within one SS block set periodicity.

FIG. 12 schematically illustrates the structure where a plurality of SS bursts are transmitted within one SS block set periodicity.

As shown in FIG. 12, transmission of a plurality of SS bursts within one SS block set periodicity may be divided into localized type transmission and distributed type transmission.

In this case, as the SS block set periodicity, one of the following values may be selected: {5 ms, 10 ms, 20 ms, 40 ms, 80 ms, and 160 ms}. In addition, 20 ms may be used as the default SS block set periodicity value for initial cell selection.

For example, for initial cell selection, a UE may assume that half frames with SS blocks occur with a periodicity of 2 frames.

2.5. Synchronization Procedure

A UE may perform synchronization by receiving an SS block from a gNB. In this case, the synchronization procedure may mainly include a cell ID detection step and a timing detection step. In this case, the cell ID detection step may include a PSS-based cell ID detection step and an SSS-based cell ID detection step. In addition, the timing detection step may include a timing detection step based on PBCH demodulation reference signals (DM-RSs) and a timing detection step based on PBCH contents (e.g., master information block (MIB)).

First, the UE may obtain time synchronization and the physical cell ID of the detected cell through detection of the PSS and SSS. Specifically, the UE may obtains symbol timing for the SS block through detection of the PSS and then detect the cell ID in a cell ID group. Thereafter, the UE detects the cell ID group through detection of the SSS.

In addition, the UE may detect the time index (e.g., slot boundary) of the SS block from a DM-RS on the PBCH. Then, the UE may obtain half-frame boundary information and system frame number (SFN) information from the MIB included in the PBCH.

3. Proposed Embodiment

Based on the above-described configuration, the present invention proposes a method by which a UE distinguishes between indices of one or more received SS blocks, determines a slot boundary (e.g., subframe boundary, frame boundary, etc.), and then transmits and receives signals with a base station based on the determined slot boundary.

3.1. SS/PBCH Block Indexing Method

In this section, a method for distinguishing between a plurality of SS/PBCH blocks (e.g., SS/PBCH blocks per half frame) in one SS burst set periodicity will be described. In this case, the plurality of SS/PBCH blocks may be transmitted in different (or independent) beam directions. At this time, the number of beams may be equal to or less than the maximum number of SS/PBCH beams in an SS/PBCH period for a particular band Hereinafter, a method for indexing a plurality of SS/PBCH blocks to distinguish between the plurality of SS/PBCH blocks will be described in detail. In this document, the index of the SS/PBCH block can be referred to as "SS/PBCH index" and "SS/PBCH block index". That is, the terms "SS/PBCH index" and "SS/PBCH block index" may mean the index of a corresponding SS/PBCH block.

First, SS/PBCH blocks may be indexed according to one of the following methods.

(1) Single index method: All SS/PBCH blocks in one SS burst set are indexed (e.g., one time index for every SS/PBCH block within an SS-burst set).

(2) Dual index method: Using two types of indices (e.g., SS burst index, SS block index), indexing is performed per SS burst in one SS burst set, and then it is performed again per SS block in one SS burst (e.g., one time index that is specific to each SS-block within an SS-burst, and an SS burst index that is specific to each SS burst within an SS-burst set. SS burst index is common across SS blocks in each SS-burst).

3.1.1. First SS/PBCH Indexing Method

In this section, how a UE distinguishes between SS/PBCH blocks (particularly, how a UE detects SS/PBCH block indices) when a BS performs transmission by using (applying) a different PBCH DM-RS for (to) each SS/PBCH block will be described. For example, when K SS blocks are transmitted in one SS burst set periodicity, the BS may allocate a different PBCH DM-RS sequence to each of the SS blocks. Here, the PBCH DM-RS means the reference signal (RS), which is used for PBCH demodulation. In some embodiment, it may be called other names.

The UE obtains time synchronization and the physical cell ID of a detected cell through PSS and SSS detection during the initial synchronization process.

Thereafter, using the PBCH DM-RS sequences, the UE may know not only how many SS/PBCH blocks are transmitted during the transmission period of the SS burst set before transmission of the detected SS/PBCH block but the detected SS/PBCH block is transmitted in which OFDM symbol of which slot of which frame. To this end, the UE should previously know PBCH DM-RSs used for individual SS/PBCH blocks during the transmission period of the SS burst set or which PBCH DM-RS is used for the SS/PBCH block transmitted in a certain OFDM symbol.

Moreover, the UE may match (or correlate) potential K DM-RS sequences, which may be used for the SS/PBCH blocks, with the received signal with respect to the detected cell and then check the transmitted (or received) DM-RS sequences based on the matching results. By doing so, the UE may obtain information on how many SS/PBCH blocks are transmitted before reception of the corresponding SS/PBCH blocks and/or information on frame boundaries.

Specifically, the following options may be used to distinguish between SS/PBCH block indices using PBCH DM-RSs. In the following description, it is assumed that the PN (Pseudo Noise) sequence or Gold sequence is used as a generation (base) sequence for the PBCH DM-RS.

(1) Option 1-1

The BS may use the PN or Gold sequence as the generation sequence for the PBCH DM-RS. In this case, the PN or Gold sequence generator may be initialized every OFDM symbol, and a cell ID and an OFDM symbol index may be used as the initial value. Alternatively, in addition to the cell ID and OFDM symbol index, a slot index may also be used as the initial value.

(2) Option 1-2

The BS may use the PN or Gold sequence as the generation sequence for the PBCH DM-RS. In this case, the PN or Gold sequence generator may be initialized every slot, and a cell ID and a slot index may be used as the initial value.

(3) Option 1-3

The BS may use the PN or Gold sequence as the generation sequence for the PBCH DM-RS. In this case, the PN or Gold sequence generator may be initialized every block, and a cell ID and an SS/PBCH block index may be used as the initial value.

(4) Option 1-4

When the above-described dual index method is used for the SS/PBCH block index, the BS may use the PN or Gold sequence as the generation sequence for the PBCH DM-RS. In this case, the PN or Gold sequence generator may be initialized every SS/PBCH block, and a cell ID and an SS block index may be used as the initial value. Additionally, as information transmitted on the PBCH, the SS burst index may be transmitted to the UE. Here, the SS burst may mean a unit for grouping a plurality of SS/PBCH blocks. In addition, the SS block index and SS burst index may respectively correspond to the first three bits and last three bits of the 6-bit information, which indicates the SS/PBCH index, according to the present invention.

According to this method, the UE may check the SS block index by matching (or correlating) the DM-RS sequences with the received signal. In addition, the UE may also check the SS burst index from information obtained by PBCH decoding. In this case, the UE may assume that each SS block in one SS burst contains the same PBCH information in order to perform combined decoding on the PBCH.

(5) Option 1-5

As a modification example of (4), the UE may partially check the SS block index and SS burst index by matching the DM-RS sequences with the received signal. Thereafter, the UE may check the complete SS burst index from the information obtained by decoding the PBCH.

For example, although the SS block index may be the same regardless of whether the SS burst index is either an even number or odd number, the PBCH DM-RS sequence may vary depending on whether the SS burst index is either an even number or odd number.

For convenience of description, it is assumed that a radio frame is 10 ms, an SS burst set periodicity is 20 ms, and four SS bursts are transmitted at an interval of 5 ms. In addition, it is also assumed that the BS generates a DM-RS sequence using a slot index.

In this case, during the SS burst set periodicity, the index of the slot where the first SS burst is transmitted is different from that of the slot where the second SS burst is transmitted. In addition, the index of the slot where the first SS burst is transmitted is equal to that of the slot where the third SS burst is transmitted, but their subframe indices may be different from each other. To distinguish between the first, second, third SS bursts (particularly, between the first and third SS bursts), the UE may know the SS burst detected from the PBCH is transmitted in either an even subframe or odd subframe.

3.1.2. Second SS/PBCH Block Indexing Method

When performing transmission, the BS may use (or apply) a different sequence for the SSS or additional SSS, which is used for each SS/PBCH block in order to distinguish between SS/PBCH blocks. Here, the additional SSS may mean the SSS transmitted for the purpose of time information detection, which is attached to the SSS for cell ID detection.

In this document, the additional SSS may be referred to as the third SS, etc.

As described above, the UE may obtain time synchronization and the physical cell ID of a detected cell through PSS and SSS detection during the initial synchronization process. Thereafter, the UE may match sequence candidates for the SSS or additional SSS, which can be transmitted on a corresponding cell, with the received signal and then detect the SS/PBCH block index and the boundary of the SS/PBCH block set periodicity using the matching results.

In this case, the following options may be applied to distinguish between SS/PBCH block indices using the sequence of the SSS or additional SSS.

(1) Option 2-1

When the single index method is used for the SS/PBCH block index, the BS may transmit a different sequence for the SSS or additional SSS in each SS/PBCH block.

(2) Option 2-2

When the dual index method is used for the SS/PBCH block index in addition to Option 2-1, the BS may allocate a different PBCH DM-RS sequence per SS block of the SS burst. Accordingly, the UE can distinguish between individual SS block indices. Thereafter, the BS may allocate a different sequence for the SSS or additional SSS per SS burst, and thus, the UE can distinguish between individual SS burst indices.

(3) Option 2-3

When the dual index method is used for the SS block index in addition to Option 2-1, the BS may allocate a different sequence for the SSS or additional SSS per SS block of the SS burst. Accordingly, the UE can distinguish between individual SS block indices. Thereafter, may allocate a different PBCH DM-RS sequence per SS burst, and thus, the UE can distinguish between individual SS burst indices.

(4) Option 2-4

When the dual index is used for the block index,

The BS may allocate a different sequence for the SSS or additional SSS per SS block of the SS burst. Accordingly, the UE can distinguish between individual SS block indices. Thereafter, the BS may transmit SS burst indices to the UE via the PBCH, and the UE may perform combined decoding on the PBCH by assuming that each SS block in one SS burst contains the same PBCH information.

3.2. Method for Distinguishing Between PBCCH TTI Boundaries

In this section, how a UE detects a PBCH TTI (super subframe) boundary (or obtains information on the PBCH TTI boundary) will described in detail.

In the following description, the SS burst set periodicity is denoted by Ps (in most cases, 5 ms), and the PBCH TTI is denoted by Pb (in most cases, 40 or 80 ms). In addition, the NR frame duration is denoted by Pf (in most cases, 10 ms).

3.1.1 Method for Distinguishing Between PBCH TTI Boundaries Using SSS

The BS may transmit the SS/PBCH block corresponding to an identical beam Pb/Ps times during the PBCH TTI. In other words, if one SSS is included in one SS/PBCH block, the SSS corresponding to the same beam is transmitted N times (where N=Pb/Ps) during the PBCH TTI.

In the following description, the SSS of the i-th SS/PBCH block transmitted in the PBCH TTI is denoted by SSS(i). In this section, a method by which the BS uses different SSS(i) (i=1, . . . , N) to enable the UE to distinguish between PBCH TTI boundaries will be described. Specifically, to allow the UE to distinguish between the PBCH TTI boundaries, the BS may allocate the SSS, which is transmitted N times during the PBCH TTI, as follows.

(1) Method for allocating different generation sequences for all SSS(i) (i=1, . . . , N)

In this case, N SSS sequences are required for each cell. If there are a total of L physical cell IDs, the BS and UE may distinguish between cell IDs and PBCH TTI boundaries using a total of L*N SSS sequences. That is, the UE may determine the cell IDs and PBCH TTI boundaries using the IDs of the SSS sequences detected during the initial synchronization acquisition process.

(2) Method for Differently Allocating a Part of the SSS Transmitted N Times During PBCH TTI The BS may make the generation sequences for SSS(1) and SSS(i) (i=2, . . . , N) be different by allocating two SSS sequences per cell so that the UE can distinguish between PBCH TTI boundaries. If there are a total of L physical cell IDs, the BS and UE may distinguish between cell IDs and PBCH TTI boundaries using a total of 2*L SSS sequences. That is, since SSS(1) is detected from the first SS/PBCH block in the PBCH TTI, the UE may determine the PBCH TTI boundaries using detected SSS(1).

If the SSS sequence of SSS(i) in the i-th SS/PBCH block transmitted in the PBCH TTI is set different from that of SSS(j) (j≠i) in another SS/PBCH block, the above method may be changed to a method for allowing the UE to determine PBCH TTI boundaries.

(3) Method for Allocating SSS Transmitted N Times During PBCH TTI Based on Combination Patterns of W Sequences The BS may allocate W SSS sequences per cell and then allow the UE to distinguish between PBCH TTI boundaries based on an N-length pattern, which is obtained by combining the W sequences. For example, the BS may allocate an SSS sequence per SS/PBCH block based on a length-8 pattern (e.g., S1, S1, S1, S2, S2, S2, S3, S3) composed of three sequences (e.g., S1, S2, S3) for the SSS transmitted eight times in the PBCH TTI. In addition, the UE may check PBCH TTI boundaries using the result value obtained by matching S1, S2, and S3 with the received signal.

3.2.2. Method for Distinguishing Between PBCH TTI Boundaries Using PBCH DM-RS Sequence (1) Alt 2-1

The BS may perform transmission by differently applying the generation sequence of the PBCH DM-RS in the SS/PBCH block, which is transmitted N times via the same beam during the PBCH TTI, per SS/PBCH block. In this case, the PN or Gold sequence may be used as the generation sequence of the PBCH DM-RS, and the PN or Gold sequence generator may be initialized every SS/PBCH block. In addition, a cell ID and a time index may be used as the initial value.

In this case, the time index may be defined according to the following methods.

1) Alt 2-1-1

Some of the OFDM symbol index, slot index, subframe index, and system frame number (SFN) may be used as the time index. For example, if the length of the PBCH TTI is a multiple of that of a frame, some of the least significant bits (LSBs) of the SFN may be used as the time index.

2) Alt 2-1-2

The SS/PBCH block index may be used as the time index. In this case, SS/PBCH block indices may be numbered according to how many SS/PBCH blocks are present in the PBCH TTI before a corresponding SS/PBCH block.

(2) A 2-2

The BS may generate overall PBCH DM-RSs to be used during the PBCH TTI and then divide the PBCH DM-RSs for each SS/PBCH block. That is, when the SS/PBCH block is transmitted N times via the same beam during the PBCH TTI, if a X-length DM-RS sequence is used in each SS/PBCH block, the BS may create an N*X-length DM-RS sequence at the beginning of the PBCH TTI and then divide the N*X-length DM-RS sequence into N portions.

According to this DM-RS generation method, the BS may use the PN or Gold sequence as the DM-RS sequence, and the PN or Gold sequence generator may be initialized every PBCH TTI. In this case, only a cell ID may be configured to be used as the initial value.

3.2.3. Method for Distinguishing Between PBCH TTI Boundaries Using PBCH Redundancy Version (RV)

The BS may perform transmission by making coded bits of channel coding output of the PBCH in the SS/PBCH block transmitted N times via the same beam during the PBCH TTI be different from each other. That is, when the SS/PBCH block is transmitted N times during the PBCH TTI, if Y PBCH coded bits are transmitted in each SS/PBCH block, the BS may create an N*Y-length PBCH coded bit sequence and then divide the N*Y-length PBCH coded bit sequence into N portions, that is, transmit the divided sequences in each SS/PBCH block. In this case, the N*Y-length PBCH coded bit sequence may be scrambled with an N*Y-length PBCH scrambling sequence and then transmitted.

3.2.4 Method for Distinguishing Between PBCH TTI Boundaries Using SSS and PBCH DM-RS Sequences The BS may provide, to the UE, information on some boundaries through SSS sequences and information on the remaining boundaries through PBCH DM-RS sequences.

For example, the BS may allocate two SSS sequences per cell and then alternately use the two sequences to enable to the UE to distinguish between 2*Ps boundaries, which is double of the SS burst set periodicity. In addition, the BS may use a different PBCH DM-RS sequence in each SS/PBCH block to enable to the UE to distinguish between Pb (=N*Ps) boundaries.

That is, the BS may use a different PBCH DM-RS sequence in every SS/PBCH block transmitted N times via the same beam during the PBCH TTI to enable the UE to distinguish therebetween. Alternatively, the BS may divide the entire time of Pb into 2*Ps intervals and then use a different PBCH DM-RS sequence in each of the divided intervals to enable the UE to distinguish therebetween.

Alternatively, the BS may allocate four SSS sequences per cell and then alternately use the four sequences to enable to the UE to distinguish between 4*Ps boundaries, which is quadruple of the SS burst set periodicity. In addition, the BS may use a different PBCH DM-RS sequence in each SS/PBCH block to enable to the UE to distinguish between Pb (=N*Ps) boundaries.

That is, the BS may use a different PBCH DM-RS sequence in every SS/PBCH block transmitted N times via the same beam during the PBCH TTI to enable the UE to distinguish therebetween. Alternatively, the BS may divide the entire time of Pb into 2*Ps or 4*Ps intervals and then use a different PBCH DM-RS sequence in each of the divided intervals (N/2 or N/4) to enable the UE to distinguish therebetween.

3.2.5. Method for Distinguishing Between PBCH TTI Boundaries Using SSS and PBCH RV The BS may provide, to the UE, information on some boundaries through SSS sequences and information on the remaining boundaries through PBCH RVs.

For example, the BS may allocate two SSS sequences per cell and then alternately use the two sequences to enable to the UE to distinguish between 2*Ps boundaries, which is double of the SS burst set periodicity. In addition, the BS may change the PBCH RV in the SS/PBCH block in each interval (obtained by dividing the entire time of Pb into Ps or 2*Ps intervals) to enable to the UE to distinguish between Pb (=N*Ps) boundaries.

Alternatively, the BS may allocate four SSS sequences per cell and then alternately use the four sequences to enable to the UE to distinguish between 4*Ps boundaries, which is quadruple of the SS burst set periodicity. In addition, the BS may change the PBCH RV in the SS/PBCH block in each interval (obtained by dividing the entire time of Pb into Ps, 2*Ps, or 4*Ps intervals) to enable to the UE to distinguish between Pb (=N*Ps) boundaries.

3.2.6. Method for Distinguishing Between PBCH TTI Boundaries Using PBCH DM-RS Sequence and PBCH RV The BS may provide, to the UE, information on some boundaries through PBCH DM-RS sequences and information on the remaining boundaries through PBCH RVs.

For example, the BS may allocate two PBCH DM-RS sequences per cell and then alternately use the two sequences to enable to the UE to distinguish between 2*Ps boundaries, which is double of the SS burst set periodicity. In addition, the BS may change the PBCH RV in the SS/PBCH block in each interval (obtained by dividing the entire time of Pb into Ps or 2*Ps intervals) to enable to the UE to distinguish between Pb (=N*Ps) boundaries.

Alternatively, the BS may allocate four PBCH DM-RS sequences per cell and then alternately use the four sequences to enable to the UE to distinguish between 4*Ps boundaries, which is quadruple of the SS burst set periodicity. In addition, the BS may change the PBCH RV in the SS/PBCH block in each interval (obtained by dividing the entire time of Pb into Ps, 2*Ps, or 4*Ps intervals) to enable to the UE to distinguish between Pb (=N*Ps) boundaries.

3.2.7. Method for Distinguishing Between PBCH TTI Boundaries Using SSS, PBCH DM-RS Sequences and PBCH RV The BS may provide, to the UE, information on some boundaries through SSS sequences, information on some remaining boundaries through PBCH DM-RS sequences, and information on the remaining boundaries through PBCH RVs.

For example, the BS may allocate two SSS sequences per cell and then alternately use the two sequences to enable to the UE to distinguish between 2*Ps boundaries, which is double of the SS burst set periodicity. In addition, the BS may allocate four PBCH DM-RS sequences per cell and then alternately use the four sequences to enable to the UE to distinguish between 4*Ps boundaries, which is quadruple of the SS burst set periodicity. Moreover, the BS may change the PBCH RV in the SS/PBCH block in each interval (obtained by dividing the entire time of Pb into Ps, 2*Ps, or 4*Ps intervals) to enable to the UE to distinguish between Pb (=N*Ps) boundaries.

3.3. PBCH TTI Configuration Method in Accordance with SS Burst Set Periodicity If the SS burst set periodicity is set different from the default value, the PBCH TTI may be determined according to one of the following methods. For example, if the SS burst set periodicity is set to one of the following values: {5 ms, 10 ms, 20 ms, 40 ms, 80 ms}, the PBCH TTI may be determined according to the following options.

(1) Opt 1: The PBCH TTI is Consistently Maintained at all Times.

According to this option, the PBCH TTI may be configured to be always maintained at the same level regardless of the SS burst set periodicity.

1) Opt 1-1

Specifically, the PBCH TTI may be fixed to the maximum value among values that can be used as the SS burst set periodicity. For example, if the SS burst set periodicity is set to be one of the following values: {5 ms, 10 ms, 20 ms, 40 ms, 80 ms}, the PBCH may be set to the maximum value, 80 ms.

The number of times that the PBCH is transmitted during the PBCH TTI may be set to one of the following values: {16, 8, 4, 2, 1} according to the configured SS burst set periodicity.

2) Opt 1-2

According to this option, the PBCH TTI may be fixed to one of the values that can be used as the SS burst set periodicity. For example, if the SS burst set periodicity is set to be one of the following values: {5 ms, 10 ms, 20 ms, 40 ms, 80 ms}, the PBCH may be set to 40 ms.

In this case, the PBCH may not be transmitted during the PBCH TTI. For example, if the SS burst set periodicity is 80 ms and the PBCH TTI is set to 40 ms, the PBCH may be transmitted at one time during one TTI among continuous PBCH TTIs.

(2) Opt 2: The PBCH TTI Varies According to the SS Burst Set Periodicity.

1) Opt 2-1

According to this option, the number of times that the PBCH is transmitted during the PBCH TTI may be fixed regardless of the SS burst set periodicity. To this end, the ratio between the SS burst set periodicity and PBCH TTI may be fixed.

For example, if the SS burst set periodicity is set to one of the following values: {5 ms, 10 ms, 20 ms, 40 ms, 80 ms}, the PBCH TTI, Pb may be set to N*Ps. By doing so, the PBCH may be transmitted N times during the PBCH TTI regardless of the configured SS burst set periodicity.

2) Opt 2-2

In Opt 2-1, if the SS burst set periodicity, Ps has a large value, the PBCH TTI may extremely increase. For example, assuming that N=4 and Ps=80, the PBCH TTI, Pb may be set to 320 ms.

To overcome this problem, the value of Pb may be limited to a specific range. For example, the PBCH TTI, Pb may be determined according to the following formula: Pb=max{N*Ps, Pb_max}.

Additionally, the master system information (MIB), which is transmitted via the PBCH, may include SFN information to inform the UE of system frame timing. In the legacy LTE system, the BS may inform the UE of the common part of SFNs of radio frames included in the PBCH TTI (i.e., the most significant bits (MSBs) of the SFNs) to minimize the information amount. For example, in the legacy LTE system, when the PBCH TTI is 40 ms, the BS may inform the UE of only MSBs of the SFN except 2-bit LSBs.

However, according to Opt 2, since the PBCH TTI varies, the length of an SFN information field included in the MIB may be designed according to the following methods. In the following description, it is assumed that a radio frame is 10 ms and an SFN is represented by (L) bits.

[1] Opt-A: The Length of the SFN Information Field Varies.

Specifically, the length of the SFN information filed may be configured to vary according to the configured PBCH TTI. For example, assuming that the ratio between the PBCH TTI and radio frame is R, only upper $L-\log_2(R)$ bits of the SFN in the MIB are transmitted, and thus the SFN information field may be configured to have a corresponding length.

1] Opt-A-1

Since the length of the SFN information field varies, the total length of the MIB may also vary. In this case, it is assumed that before PBCH decoding, the UE already knows the PBCH TTI using other methods. Accordingly, the UE determines the total length of the MIB and then performs the PBCH decoding according to the total length of the MIB.

2] Opt-A-2

The length of reserved bits may be configured to vary such that when the length of the SFN information field varies, the total length of the MIB length is not changed. In other words, the total MIB length may not be changed by fixing the sum of the SFN information field length and reserved-bit length to a certain value. In this case, even though the UE does not obtain the PBCH TTI before PBCH decoding, the UE may perform the PBCH decoding. Thus, the PBCH TTI or SS burst set periodicity information may be transmitted together with the MIB.

[2] Opt-B: The Length of the SFN Information Field May be Fixed.

1] Opt-B-1

The length of the SFN information field may be set to a specific value which is required when the PBCH TTI has the minimum value. For example, assuming the ratio between the minimum PBCH TTI and radio frame is R_min, the SFN of the MIB may be set using upper $L-\log_2(R\_min)$ bits.

2] Opt-B-2

As the SFN information included in the MIB, the BS may inform the UE of the SFN of the first radio frame in the PBCH TTI as it is, that is, (L) bits without decreasing it.

3.4. SSS Index Hopping Method

Additionally, the UE may detect a neighboring cell through SSS detection and then report the results of measuring the average reception level of SSSS without any additional verification process to the BS via layer 3 to assist handover determination.

In this method, the number of times that a virtual cell is falsely detected due to errors, that is, the number of cases where reporting becomes meaningless should be minimized. In this case, the false SSS detection may frequently occur if the correlation characteristics between two cells' SSS sequences is poor. For example, assuming that that a normalized correlation value between an SSS transmitted from the a-th cell (denoted by $SSS_a$) and an SSS transmitted from the b-th cell (denoted by $SSS_b$) is more than 05, if $SSS_a$ is detected, the UE may determine that $SSS_b$, which is weaker than $SSS_a$ by 3 dB, has been detected together.

To reduce the probability of the false SSS detection, a method for changing the SSS used in each cell depending on time may be used.

For example, as described above in section 3.2, when SSSs used in one cell are used cyclically according to the PBCH TTI, the SSSs used in the corresponding cell may be changed depending on time. Alternatively, the circulation cycle of the SSS may be defined as a multiple of the PBCH TTI or SS burst set periodicity.

When the SSS of the i-th SS/PBCH block transmitted via the same beam during the SSS circulation cycle is denoted by SSS(i), the BS may randomize correlation between SSSs transmitted in different cells by differently setting SSS(i) (i=1, . . . , N). That is, the BS may design the pattern of SSS(i), which is allocated to each cell, such that a correlation value between $SSS_a(i)$ used in the a-th cell and $SSS_b(i)$ used in the b-th cell varies depending on time.

Additionally, when there are a total of L physical cell IDs, the BS may allocate different sequences to all $SSS_a(i)$ (a=1, . . . , L, i=1, . . . , N). According to this method, the pattern of SSS(i) can be easily designed. However, since a total of L*N SSS sequences are required, the UE should calculate which sequence among the L*N sequences is transmitted during the cell detection process. That is, this method is disadvantageous in that computational complexity increases from the perspective of the UE.

Additionally, the BS may design the pattern of SSSa(i) for L cells using only L or c*L (c<N) sequences. This method can be expressed according to the following equation.

$$SSS_a(i)=S(f(a,i)), a=1, \ldots, L, i=1, \ldots, N \quad \text{[Equation 1]}$$

In Equation 1, f(a,i) indicates c*L sequences that can be used for the SSS, and S(m) is a function for indicating which sequence is used for the i-th SSS in the a-th cell (where m=1, . . . , (c*L)).

For example, in the case of c=1, f(a,i) can be expressed as follows.

$$f(a,i)=\mod(a+i-2,L)+1 \quad \text{[Equation 2]}$$

In the case of N=4, S(1), S(2), S(3), and S(4) may be used cyclically as the SSS sequence for the first cell (a=1), and S(2), S(3), S(4), and S(5) may be used cyclically as the SSS sequence for the second cell (a=2). According to this method, the final cell ID may be finally confirmed by the SS burst set periodicity boundary and the detected SSS sequence pattern.

As another example, in the case of c=1, f(a,i) can be expressed as follows.

$$f(a,i)=\mod(L'(a+i-2),L') \quad \text{[Equation 3]}$$

In Equation 3, L' indicates a prim number more than L. As described above, the BS may generate and use L' as the SSS sequence. Alternatively, when the sequence using L SSS sequences is used, if a generated index is more than L, the generated index is discarded, and the time index i additionally increases.

Figure 13:
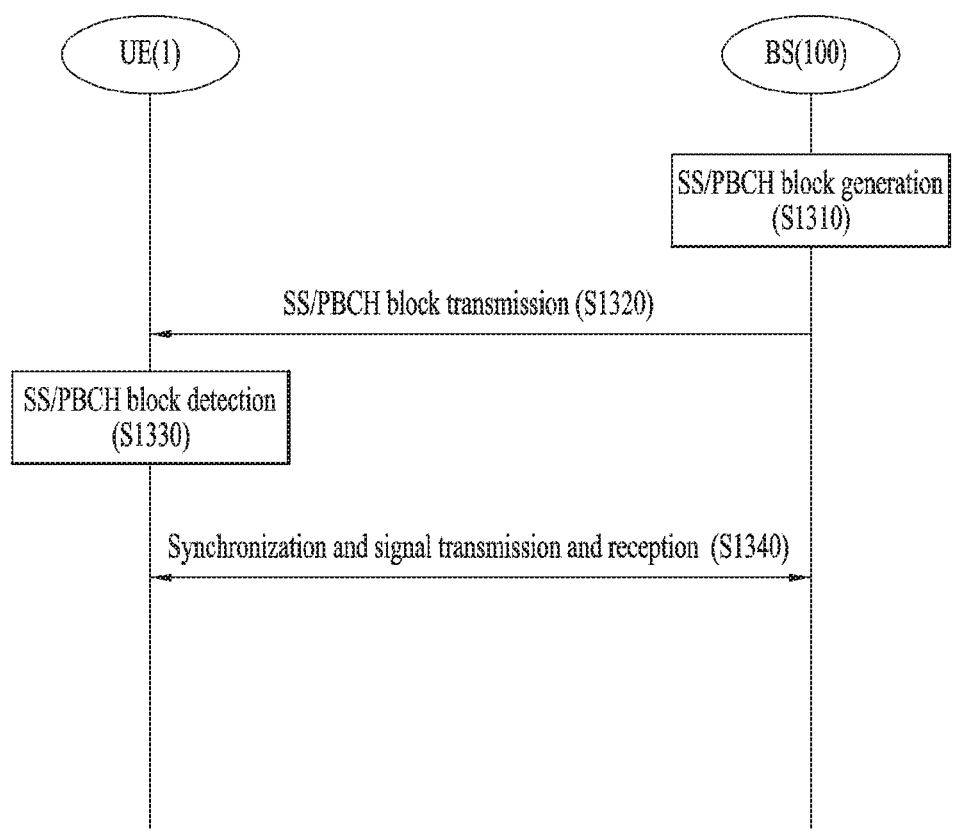
FIG. 13 illustrates a method for transmitting and receiving signals between a UE and a BS applicable to the present invention.

FIG. 13 illustrates a method for transmitting and receiving signals between a UE and a BS applicable to the present invention.

First, the BS 100 generates at least one synchronization signal/physical broadcast channel (SS/PBCH) block to be transmitted [S1310]. In this case, since an SS/PBCH block includes a PSS, an SSS, and a PBCH, the BS 100 may generate each SS/PBCH block such that it contains the PSS, SSS, and PBCH corresponding thereto.

In particular, the BS 100 may generate each SS/PBCH block such that a DM-RS sequence for a PBCH per SS/PBCH block indicates the index of each SS/PBCH block or a combination of the DM-RS sequence for the PBCH per SS/PBCH block and information included in the PBCH per SS/PBCH block indicates the index of each SS/PBCH block.

To this end, the BS 100 may generate the DM-RS sequence for the PBCH included in each SS/PBCH block using a cell identifier (ID) and each SS/PBCH block index. In this case, the DM-RS sequence for the PBCH included in each SS/PBCH block may be generalized using a Gold sequence.

Next, the BS 100 transmits the at least one SS/PBCH block [S1320]. Specifically, the BS 100 may transmits a plurality of SS/PBCH blocks as shown in FIG. 12. For example, the BS 100 may transmit each SS/PBCH block via an independent (or different) beam. Accordingly, from the perspective of a specific UE (1), one SS/PBCH block among the plurality of SS/PBCH blocks may be received, or the signal strength of an SS/PBCH block may be high and that of another SS/PBCH block may be low.

In this case, a transmission time interval (TTI) of the PBCH included in the SS/PBCH block may be set to 80 ms. In other words, the PBCH included in each SS/PBCH block may carry the same information during the 80 ms.

This configuration will be described again from the perspective of the UE 1. The UE 1 may receive some or all of the one or more SS/PBCH blocks.

Next, the UE 1 detects the received SS/PBCH block [S1330]. Specifically, the UE may detect the index of the received SS/PBCH block based on a DM-RS sequence for the PBCH included in the received SS/PBCH block (or a combination of the sequence and information included in the PBCH. By doing so, the UE 1 may detect the index (or location) of the received SS/PBCH block among the plurality of SS/PBCH blocks shown in FIG. 12.

Additionally, the UE 1 may obtain time synchronization and a cell identifier (ID) based on the PSS and SSS included in the SS/PBCH block.

Next, by detecting a slot boundary based on the determined SS/PBCH block index and the like, the UE 1 may achieve synchronization with the BS 100 and transmit and receive signals with the BS 100 [S1340].

Since the NR system to which the present invention is applicable can support transmission via one or more beam directions, the BS 100 may transmit SS/PBCH blocks in independent beam directions. The UE 1 may detect the index of the received SS/PBCH block based on the DM-RS sequence for the PBCH included in the received SS/PBCH block (or the combination of the sequence and the information included in the PBCH), detect the slot boundary (e.g., subframe boundary, half frame boundary, frame boundary, etc.), and then achieve the synchronization with the BS 100.

Since each of the embodiments of the above-described proposed methods may be considered as one method for implementing the present invention, it is apparent that each embodiment can be regarded as a proposed method. In addition, the present invention can be implemented not only using the proposed methods independently but also by combining (or merging) some of the proposed methods. Moreover, a rule may be defined such that the BS should inform the UE of information on whether the proposed methods are applied (or information on rules related to the proposed methods) through a predefined signal (e.g., physical layer signal, higher layer signal, etc.).

4. Device Configuration

Figure 14:
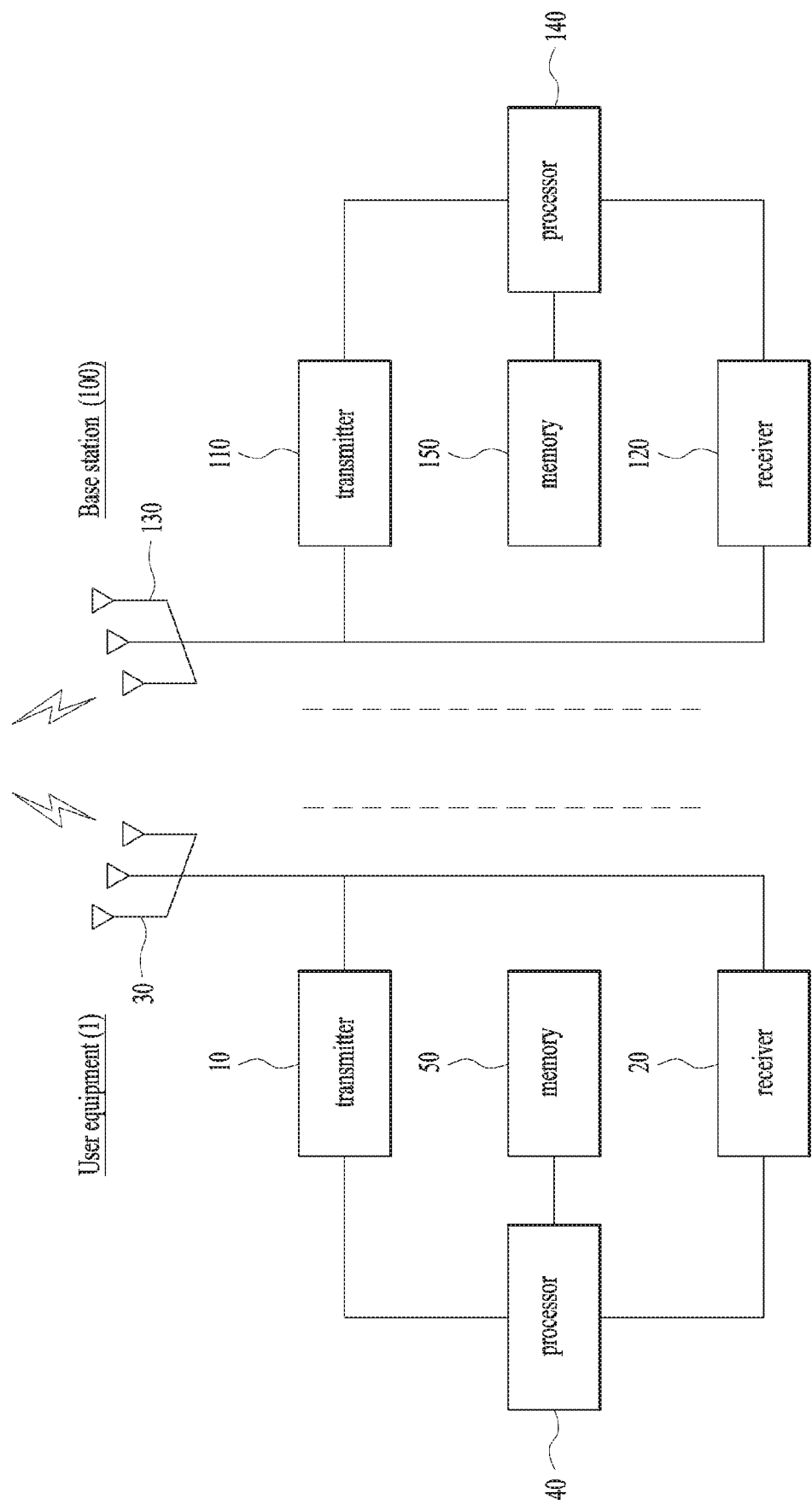
FIG. 14 illustrates the configurations of a UE and a BS for implementing the proposed embodiments.

FIG. 14 is a diagram illustrating configurations of a UE and a BS capable of being implemented by the embodiments proposed in the present invention. The UE and BS illustrated in FIG. 14 operate to implement the above-described embodiments of the method for transmitting and receiving signals therebetween.

The UE 1 may act as a transmission end on UL and as a reception end on DL. The BS (eNB or gNB) 100 may act as a reception end on UL and as a transmission end on DL.

That is, each of the UE and the BS may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 receives a synchronization signal/physical broadcast channel (SS/PBCH) block from the BS 100 through the receiver 20. Next, the UE 1 determines the index of the received SS/PBCH block based on a demodulation reference signal (DM-RS) sequence for a PBCH included in the SS/PBCH block or a combination of the sequence and information included in the PBCH through the processor 40. Thereafter, the UE 1 performs synchronization with the BS 100 based on the determined SS/PBCH block index through the transmitter 10 and receiver 20.

In addition, the BS 100 transmits at least one synchronization signal/physical broadcast channel (SS/PBCH) block through the transmitter 110. In this case, a demodulation reference signal (DM-RS) sequence for a PBCH included in each SS/PBCH block or a combination of the sequence and information included in the PBCH is configured to indicate the index of each SS/PBCH block.

Next, the BS 100 transmits and receives signals with the UE that performs synchronization with the BS 100 based on the at least one SS/PBCH block through the transmitter 110 and receiver 120.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting and receiving signals to and from a base station (BS) by a user equipment (UE) in a wireless communication system, the method comprising:
   receiving from the BS, a synchronization signal/physical broadcast channel (SS/PBCH) block;
   determining an index of the received SS/PBCH block based on either a demodulation reference signal (DMRS) sequence for a PBCH included in the SS/PBCH block or a combination of the DMRS sequence and information included in the PBCH,
   wherein the DMRS sequence is initialized in a unit of the SS/PBCH block, based on an initial value determined based on a cell identifier (cell ID) and the index of the SS/PBCH block; and
   performing synchronization with the BS based on the determined index of the SS/PBCH block.

2. The method of claim 1, wherein the SS/PBCH block further comprises a primary synchronization signal (PSS) and a secondary synchronization signal (SSS).

3. The method of claim 2, further comprising obtaining time synchronization and the cell ID based on the PSS and SSS.

4. The method of claim 3, wherein a Gold sequence is used as the DMRS sequence.

5. The method of claim 1, wherein the PBCH has a transmission time interval (TTI) of 80 ms.

6. The method of claim 1, wherein the determining the index of the received SS/PBCH block based on the DMRS sequence comprises that the UE determines the index of the received SS/PBCH block according to a matching procedure for the DMRS sequence,
   wherein he determining the index of the received SS/PBCH block based on the combination of the DMRS sequence the information included in the PBCH comprises that the UE determines the index of the received SS/PBCH block based on:
   (i) first index determined based on a matching procedure, and
   (ii) second index determined based on the information included in the PBCH.

7. A method of transmitting and receiving signals to and from a user equipment (UE) by a base station (BS) in a wireless communication system, the method comprising:
   transmitting at least one synchronization signal/physical broadcast channel (SS/PBCH) block,
   wherein either a demodulation reference signal (DMRS) sequence for a PBCH included in each SS/PBCH block or a combination of the DMRS sequence and information included in the PBCH indicates an index of each SS/PBCH block,
   wherein the DMRS sequence, included in each SS/PBCH block, is initialized in a unit of the SS/PBCH block, based on an initial value determined based on a cell identifier (cell ID) and the index of the SS/PBCH block; and
   transmitting and receiving the signals to and from the UE that performs synchronization with the BS based on the at least one SS/PBCH block.

8. The method of claim 7, wherein the at least one SS/PBCH block is transmitted via an independent beam.

9. The method of claim 7, wherein the SS/PBCH block further comprises a primary synchronization signal (PSS) and a secondary synchronization signal (SSS).

10. The method of claim 9, wherein the DMRS sequence for the PBCH included in each SS/PBCH block corresponds to a Gold sequence based on the cell ID and each SS/PBCH block index.

11. A user equipment (UE) for transmitting and receiving signals to and from a base station (BS) in a wireless communication system, the UE comprising:
    a transmitter;
    a receiver; and
    a processor connected to the transmitter and receiver,
    wherein the processor is configured to:
    receive from the BS, a synchronization signal/physical broadcast channel (SS/PBCH) block;
    determine an index of the received SS/PBCH block based on either a demodulation reference signal (DMRS) sequence for a PBCH included in the SS/PBCH block or a combination of the DMRS sequence and information included in the PBCH,
    wherein the DMRS sequence is initialized in a unit of the SS/PBCH block, based on an initial value determined based on a cell identifier (cell ID) and the index of the SS/PBCH block; and
    perform synchronization with the BS based on the determined index of the SS/PBCH block.

12. A base station (BS) for transmitting and receiving signals to and from a user equipment (UE) in a wireless communication system, the BS comprising:
    a transmitter;
    a receiver; and
    a processor connected to the transmitter and receiver,
    wherein the processor is configured to:
    transmit at least one synchronization signal/physical broadcast channel (SS/PBCH) block,
    wherein either a demodulation reference signal (DMRS) sequence for a PBCH included in each SS/PBCH block or a combination of the DMRS sequence and information included in the PBCH indicates an index of each SS/PBCH block, wherein the DMRS sequence, included in each SS/PBCH block, is initialized in a unit of the SS/PBCH block, based on an initial value determined based on a cell identifier (cell ID) and the index of the SS/PBCH block; and transmit and receive the signals to and from the UE that performs synchronization with the BS based on the at least one SS/PBCH block.

\* \* \* \* \*